(12) United States Patent
Zeng et al.

(10) Patent No.: US 9,563,808 B2
(45) Date of Patent: Feb. 7, 2017

(54) TARGET GROUPING TECHNIQUES FOR OBJECT FUSION

(71) Applicant: GM GLOBAL TECHNOLOGY OPERATIONS LLC, Detroit, MI (US)

(72) Inventors: Shuqing Zeng, Sterling Heights, MI (US); Kevin A. O'Dea, Ann Arbor, MI (US); Dmitriy Feldman, West Bloomfield, MI (US); James N. Nickolaou, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 23 days.

(21) Appl. No.: 14/597,108

(22) Filed: Jan. 14, 2015

(65) Prior Publication Data

US 2016/0203374 A1 Jul. 14, 2016

(51) Int. Cl.
*G06K 9/00* (2006.01)
*G06K 9/62* (2006.01)
*G06T 7/00* (2006.01)

(52) U.S. Cl.
CPC ......... *G06K 9/00798* (2013.01); *G06K 9/6201* (2013.01); *G06K 9/6218* (2013.01); *G06K 9/6267* (2013.01); *G06T 7/004* (2013.01)

(58) Field of Classification Search
None
See application file for complete search history.

(56) References Cited

U.S. PATENT DOCUMENTS

| | | | | |
|---|---|---|---|---|
| 7,991,550 B2* | 8/2011 | Zeng | ..................... | G01S 7/4026 340/435 |
| 2006/0271256 A1* | 11/2006 | Siebel | ................ | G05B 23/0278 701/32.7 |
| 2008/0300787 A1* | 12/2008 | Zeng | ..................... | G01S 7/4026 701/301 |
| 2011/0046842 A1* | 2/2011 | Smith | ..................... | G07C 5/006 701/31.4 |
| 2013/0016912 A1* | 1/2013 | Li | ......................... | G06K 9/4671 382/197 |

(Continued)

OTHER PUBLICATIONS

Zeng, Shuqing U.S. Appl. No. 14/156,681, filed Jan. 16, 2014 entitled "Object Fusion System of Multiple Radar Imaging Sensors".

*Primary Examiner* — Nancy Bitar
(74) *Attorney, Agent, or Firm* — John A. Miller; Miller IP Group, PLC (57) ABSTRACT

A method is disclosed for improved target grouping of sensor measurements in an object detection system. The method uses road curvature information to improve grouping accuracy by better predicting a new location of a known target object and matching it to sensor measurements. Additional target attributes are also used for improved grouping accuracy, where the attributes includes range rate, target cross-section and others. Distance compression is also employed for improved grouping accuracy, where range is compressed in a log scale calculation in order to diminish errors in measurement of distant objects. Grid-based techniques include the use of hash tables and a flood fill algorithm for improved computational performance of target object identification, where the number of computations can be reduced by an order of magnitude.

18 Claims, 8 Drawing Sheets

(56) References Cited

U.S. PATENT DOCUMENTS

2013/0158779 A1* 6/2013 Gloos .................. G07C 5/0808
701/33.4
2015/0288947 A1* 10/2015 Ahrns .................. G06K 9/6202
348/46

* cited by examiner

TARGET GROUPING TECHNIQUES FOR OBJECT FUSION

BACKGROUND OF THE INVENTION

Field of the Invention

This invention relates generally to enhanced target identification in an object detection system and, more particularly, to a method for grouping object sensor measurements into targets which uses road curvature information, additional target attributes and distance compression for improved grouping accuracy, and grid-based matching using hash tables for improved computational performance.

Discussion of the Related Art

Many vehicles now include object detection systems which employ any of a number of different technologies for detecting and identifying objects in the vicinity of a host vehicle, where the objects may include other vehicles, pedestrians, fixed objects, etc. The technologies used for object detection include cameras with image processing algorithms, radar, lidar and ultrasound, among others. Data from the object detection system are typically used in one or more downstream systems in the vehicle—including collision warning systems, collision avoidance systems, and other driver alert-type systems.

Object detection systems can also be used to identify curbs, lane stripes, guard rails and median walls, and the location of these items can be used in a lane sensing system to determine lane geometry in the road ahead of the host vehicle.

Given the proliferation of object detection sensors on vehicles, and the wide variety of types of objects that are to be detected, the speed and accuracy of processing all of the object sensor data is paramount. Although some progress has been made in this area in the past, more improvements are needed to achieve the goal of efficiently translating a set of raw sensor measurements into an accurate list of vehicles and other targets in the vicinity of the host vehicle.

SUMMARY OF THE INVENTION

In accordance with the teachings of the present invention, a method is disclosed for improved target grouping of sensor measurements in an object detection system. The method uses road curvature information to improve grouping accuracy by better predicting a new location of a known target object and matching it to sensor measurements. Additional target attributes are also used for improved grouping accuracy, where the attributes includes range rate, target cross-section and others. Distance compression is also employed for improved grouping accuracy, where range is compressed in a log scale calculation in order to diminish errors in measurement of distant objects. Grid-based techniques include the use of hash tables and a flood fill algorithm for improved computational performance of target object identification, where the number of computations can be reduced by an order of magnitude.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a method for grouping object sensor measurements with targets in an object detection system is merely exemplary in nature, and is in no way intended to limit the invention or its applications or uses.

Object detection systems have become increasingly common on modern vehicles, as collision warning and avoidance systems and other advanced systems become more popular with consumers. In order to provide accurate and timely object information, object detection systems have been developed which use different sensor technologies and different techniques for object recognition. All of these systems, however, can benefit from improved accuracy of target tracking and improved computational efficiency.

Figure 1:
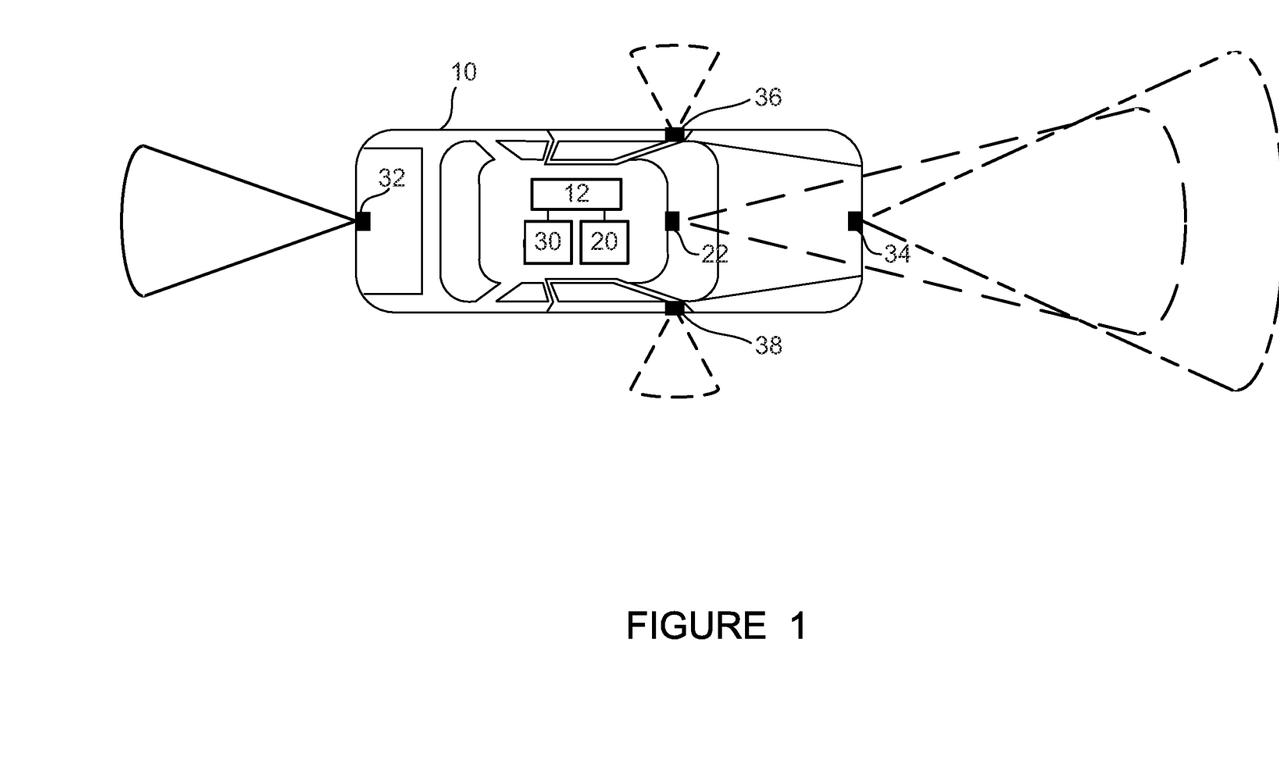
FIG. 1 is a schematic diagram of a vehicle with two different types of object detection systems.

FIG. 1 is a schematic diagram of a vehicle 10 including an object detection system 12 which receives information about surrounding objects from first object sensing system 20 and a second object sensing system 30. The first object sensing system 20 receives images from a front camera 22, which can detect many different types of objects in front of the vehicle 10. The front camera 22 may detect leading vehicles, pedestrians, curbs and median walls, overpasses, signs and other objects, and the first object sensing system 20 tracks these detected objects relative to the vehicle 10.

The second object sensing system 30 receives measurements from a plurality of sensors around the vehicle 10. The sensors may include a rear sensor 32, a front sensor 34, and side sensors 36 and 38. All of the sensors 32-38 may use radar, lidar, ultrasound, or some other sensing technology to detect objects around the vehicle 10. The objects sensing systems 20 and 30 are merely exemplary of the types of object sensors that may be deployed on the vehicle 10. The vehicle 10 need not include exactly one camera-based object sensing system and one non-camera-based system. There may in fact be only one object sensing system, or more than one using different combinations of camera, radar, lidar, ultrasound, etc.

The object sensing systems 20 and 30 provide their sensor measurements to the object detection system 12, which associates sensor measurements with a list of tracked target objects (vehicles, overpasses, trees, pedestrians, etc.) in real time. It is a primary objective of the object detection system 12 to provide accurate and efficient grouping of sensor measurements into target objects.

It is to be understood that the object detection system 12, the first object sensing system 20 and the second object sensing system 30 are comprised of at least a processor and a memory module, where the processors are configured with software designed to receive sensor measurements and identify and track target objects. The logic and calculations used in the object detection system 12 will be discussed in detail below.

It is to be further understood that the features and calculations of the object detection system 12, the first object sensing system 20 and the second object sensing system 30 could be divided up differently than described herein without departing from the spirit of the disclosed invention. For example, all sensor measurement grouping and target fusion calculations could be performed in a single processor in the object detection system 12. That is, systems 12, 20 and 30 could be embodied in a single physical device, or multiple different modules; none of these configuration options has any impact on the inventive methods discussed below.

Figure 2:
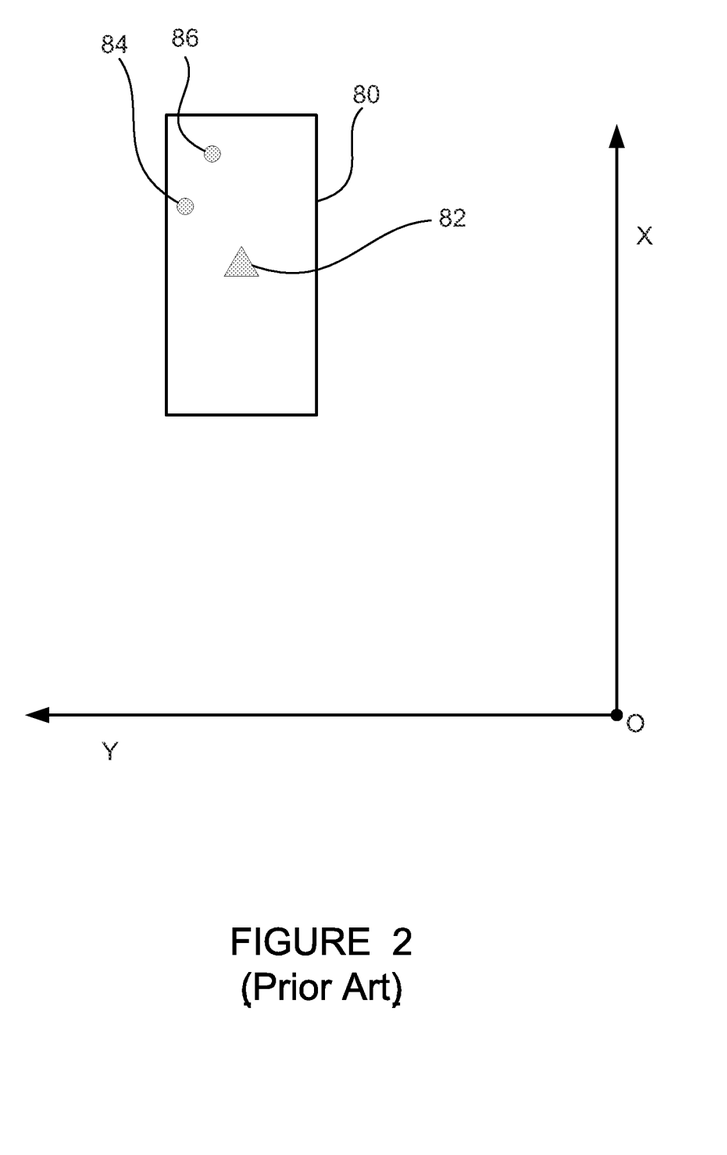
FIG. 2 is an illustration of how a traditional object detection system matches sensor measurements with potential targets.

FIG. 2 is an illustration of how a traditional object detection system matches sensor measurements with potential targets. A target vehicle 80 is represented by a hypothesis centroid location 82, along with a length L and a width W, where the centroid location 82 is at a location $(x_f, y_f)$. The vehicle 80 is used as an example of one common type of object that may be detected by an object detection system. Sensor measurement points 84 and 86 are to be checked to determine if they belong to the target vehicle 80 and support the hypothesis centroid location 82. One method to determine this is by checking the following inequality:

$$\max\left(\left|\frac{x-x_f}{L/2}\right|, \left|\frac{y-y_f}{W/2}\right|\right) < 1 \quad (1)$$

Where x and y are the coordinates of the measurement point 84 or 86 which is being checked, and the other variables were described above. If the inequality of Equation (1) is true, then the point coordinates (x,y) are confirmed to fall within the rectangle centered at $(x_f, y_f)$, and the measurement point 84, for example, is determined to belong to the target vehicle 80 and support the hypothesis centroid location 82.

While the traditional technique embodied in Equation (1) is adequate for target vehicles traveling straight ahead in front of a host vehicle, it may not yield accurate results in the case of other types of objects, in situations where road curvature affects target position and orientation, or in other circumstances. False association of sensor measurement points to targets causes erroneous target fusion results, which can lead to errors in downstream systems which use the object detection data.

Several techniques are discussed below which increase both the accuracy and the computational efficiency of grouping sensor measurement points with a list of target objects.

Figure 3:
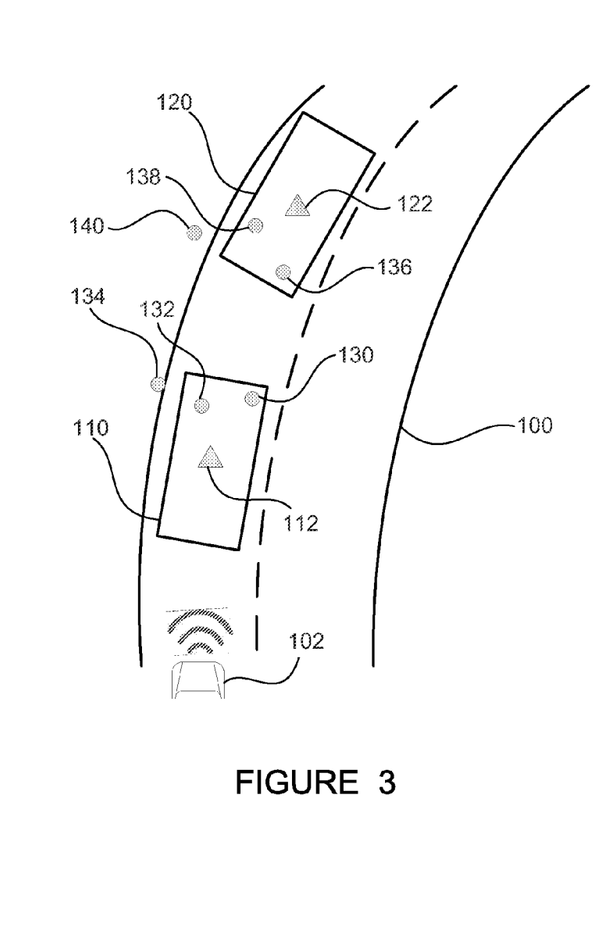
FIG. 3 is an illustration of how road curvature information can be used to track the movement of target objects and match them with sensor measurements.

FIG. 3 is an illustration of how road curvature information can be used to track the movement of target objects and match them with sensor measurements. A road 100 curves to the right ahead of a host vehicle 102, as shown. An object detection system in the vehicle 102, such as the system 12 of FIG. 1, is tracking two target vehicles ahead—a vehicle 110 and a vehicle 120. In the object detection system of the host vehicle 102, the target vehicle 110 has a hypothesis centroid location 112, and the target vehicle 120 has a hypothesis centroid location 122, where both the hypothesis centroid locations 112 and 122 are determined based on previous time-step centroid locations and the known curvature of the road 100. That is, the object detection system in the host vehicle 102 expects the vehicles 110 and 120 to follow a curve to the right rather than continue straight ahead in the direction of their previous velocity vector.

A number of sensor measurement points (130-140) need to be identified as either belonging to the target vehicle 110 or 120, or neither. As shown in FIG. 3, with the target vehicles 110 and 120 having a position and orientation which follow the road curvature, the measurement points 130 and 132 belong to the target vehicle 110, the points 136 and 138 belong to the target vehicle 120, and the points 134 and 140 are off to the left side of the road 100 and presumably belong to different objects such as trees or signs.

It can be seen in FIG. 3 that if the host vehicle 102 did not account for road curvature, and the hypothesis centroid locations 112 and 122 were directly in front of their previous location, the resultant grouping of points with target objects would be much different. In such a situation, the measurement point 130 would likely not group with the vehicle 110 as it should, the point 134 would likely erroneously group with the vehicle 110, the measurement point 136 would likely not group with the vehicle 120 as it should, and the point 140 would likely erroneously group with the vehicle 120. In summary, using road curvature for prediction of target locations prevents erroneous target vehicle grouping results for four of the six measurement points in this example.

Figure 4:
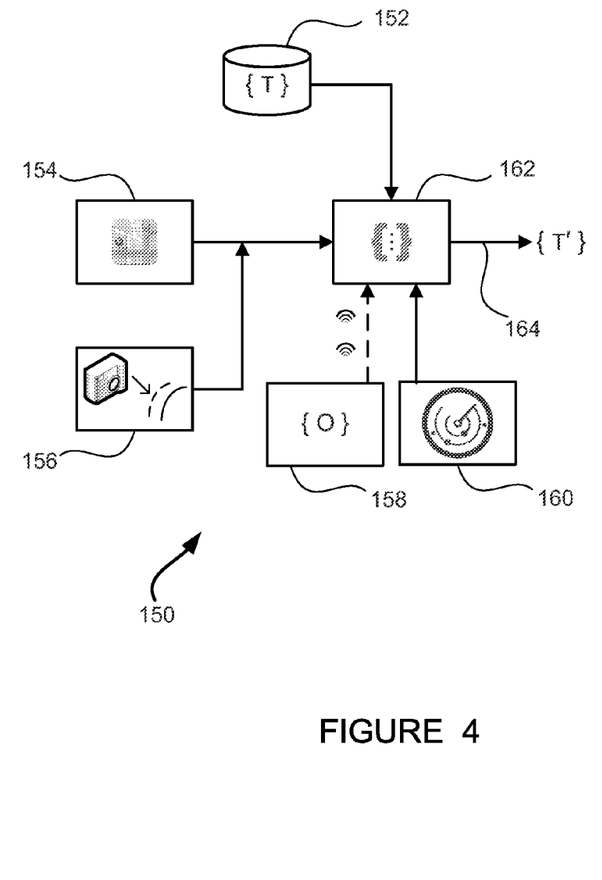
FIG. 4 is a block diagram of a system which uses two sources of road curvature information and outside information sources, along with a list of known target objects, to group sensor measurements into a new list of targets.

FIG. 4 is a block diagram of a system 150 which uses two sources of road curvature information and outside information sources, along with a list of known target objects, to group sensor measurements into a new list of targets. The system 150 implements the road curvature anticipation which is illustrated in FIG. 3. Database 152 contains current object fusion data including a list of tracked targets {T} and their centroid locations. Digital map data is provided at box 154, where the digital map data is of the type commonly used in vehicle navigation systems, including road type, road curvature, and much more information. At box 156, lane curvature data is provided by an in-vehicle lane tracking system, if available. In-vehicle lane tracking systems are available in many vehicles which use camera images or other types of data acquisition to identify and track lane boundaries such as curbs, road stripes, median walls, etc. The lane curvature data from the lane tracking system at the box 156, if available, provides a source of road curvature information which is supplemental to, or can be used in lieu of, the road curvature information from the digital map of the box 154.

Object data from any source outside the host vehicle 102 is provided at box 158. The data at the box 158 is provided via wireless communication channels using vehicle-to-vehicle (V2V), vehicle-to-infrastructure (V2I) or even vehicle-to-pedestrian communications technologies such as Dedicated Short Range Communications (DSRC), Wi-Fi, etc. The data at the box 158 can be provided by one or many external sources, and collectively includes a list of objects {O} which are known by the external sources. For example, the data at the box 158 may include a target vehicle position being broadcast by another vehicle via V2V, and/or a group of construction barrels which have been detected by a roadside camera and are being broadcast via V2I. Many types of objects are now becoming "location aware", and any of these objects with suitable communications capability may provide their object data (type, size, location, orientation, movement) at the box 158. The object list {O} at the box 158 is optional, as the external data sources and known objects may not always be present.

Object sensor measurements from object sensors onboard the host vehicle 102 are provided at box 160. The object sensor measurements include points where an object is detected, such as the points 130-140 of FIG. 3. Box 162 contains a processor, such as the processor in the object detection system 12 of FIG. 1, running a grouping algorithm which matches sensor measurement points to known targets. As discussed above regarding FIG. 3, the algorithm running in the box 162 uses road curvature information to determine the hypothesis centroid locations of the vehicles 110 and 120, thus resulting in much better matching of sensor measurement points to tracked target vehicles. The grouping algorithm running in the box 162 also benefits from a priori knowledge of fixed or moving objects from outside sources, provided at the box 158. An updated target list {T} with object centroid locations is provided as output on line 164.

Figures 5A, 5B, 5C:
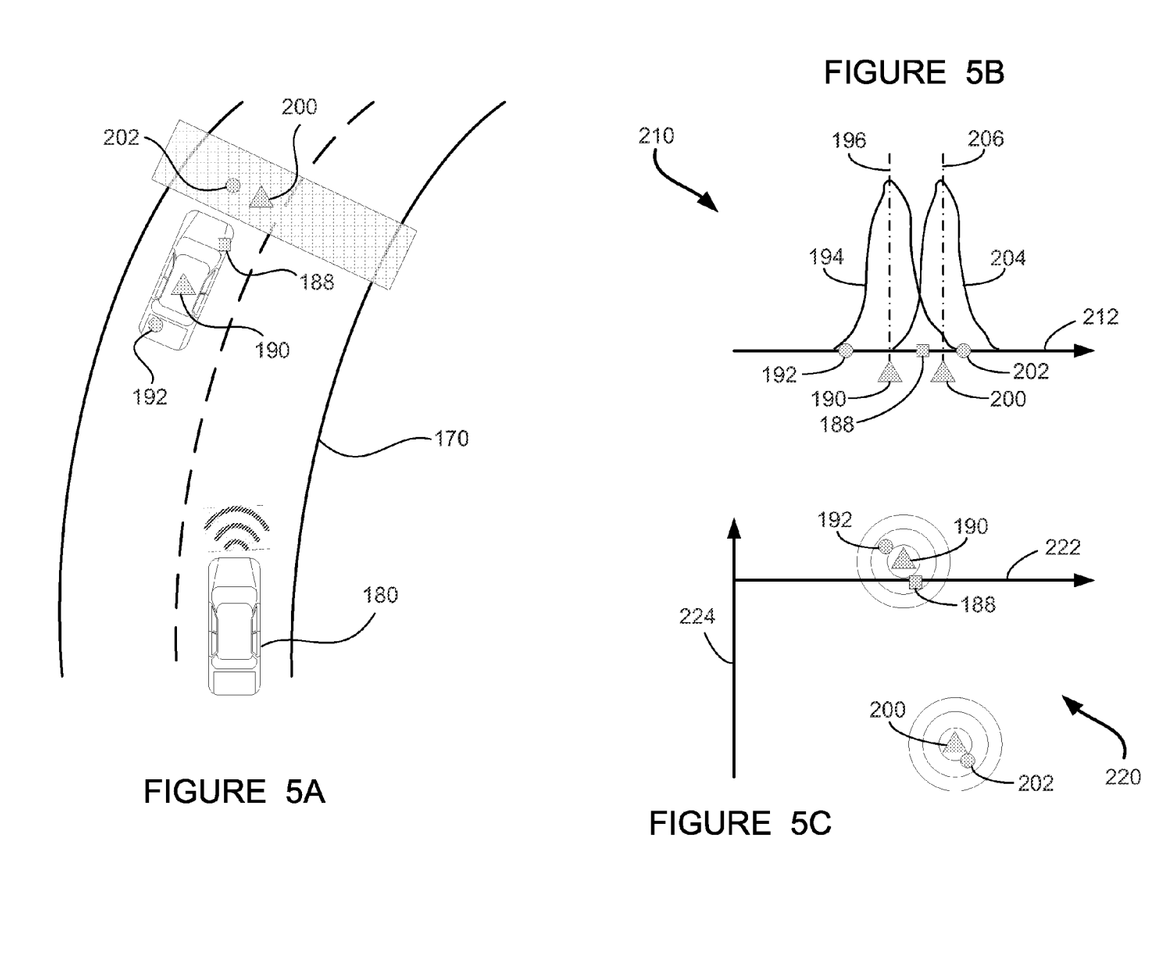
FIG. 5A is an illustration of a host vehicle tracking both fixed and moving objects in the roadway ahead.
FIG. 5B is a graph showing ambiguity in grouping a sensor measurement with a target which can arise when only range is used as a parameter.
FIG. 5C is a graph on which object range rate is included to improve grouping of sensor measurements to targets.

In the preceding discussion, grouping of sensor measurements with target vehicles was based only on location (range and azimuth) of the measurements and the target vehicles. However, other attributes of the sensor measurements and the target vehicles can be used to improve the accuracy of the grouping process. FIG. 5A is an illustration of a host vehicle tracking both fixed and moving objects on a roadway ahead. On a road 170, a host vehicle 180 is driving and tracking objects ahead with an object detection system such as the system 12 of FIG. 1. A target vehicle 190 is being tracked by the host vehicle 180. An overpass 200, which crosses over the road 170, is also being tracked as an object by the host vehicle 180. The overpass 200 could be any structure which crosses over the road 170, including a bridge/overpass, a sign structure, a tunnel entrance, etc. Instead of the overpass 200, a roadside object like a tree, or a pedestrian, or an obstacle in the road could be used to the same effect in this example.

The object detection system in the vehicle 180 provides three sensor measurements in this illustrative example—a measurement point 192 which is easily associated with the vehicle 190, a point 202 which is associated with the overpass 200, and a measurement point 188. Because of the proximity of the vehicle 190 to the overpass 200, range information alone is insufficient to determine to which target the point 188 belongs. Azimuth angle information also does not help resolve the ambiguity, as can be seen in FIG. 5A.

FIG. 5B is a graph 210 showing the ambiguity in grouping a sensor measurement with a target which can arise when only range is used as a parameter, as illustrated in FIG. 5A. The graph 210 plots range on axis 212. The measurement points 192, 188 and 202 are shown in their respective positions on the axis 212. The centroid locations of the vehicle 190 and the overpass 200 are also shown just below the axis 212. The centroid location of the vehicle 190 prescribes a probability distribution 194 with a centerline 196, and the centroid location of the overpass 200 prescribes a probability distribution 204 with a centerline 206. The probability distributions 194 and 204 are shown as being the same in this example for simplicity. It can be seen in FIG. 5B that the measurement point 188 falls well within the both the probability distribution 194 of the vehicle 190 and the probability distribution 204 of the overpass 200. Thus, it is not possible to accurately group the point 188 with either the vehicle 190 or the overpass 200 based on range alone.

FIG. 5C is a graph 220 on which object range rate is included to improve grouping of sensor measurements to targets. Object detection systems which are radar-based or lidar-based will typically provide range rate data along with range and azimuth data for sensor measurements. For camera-based object detection systems, range rate can be determined by tracking target range over multiple time steps and dividing range change by elapsed time. On the graph 220, range is plotted on axis 222 and range rate is plotted on axis 224. The centroid locations of the vehicle 190 and the overpass 200, along with the measurement points 192, 188 and 202, are shown in their respective range positions. As discussed above, there is little separation in the range values of the vehicle 190, the overpass 200 and the points 192, 188 and 202.

Now, however, range rate provides clear separation between the vehicle 190 and the overpass 200 and their associated measurement points. The vehicle 190, driving at about the same speed as the host vehicle 180, has a very small range rate, as can be seen on the graph 220. On the other hand, the overpass 200, being stationary, has a large negative range rate relative to the host vehicle 180. Using both range and range rate attributes of the targets and measurement points, it is clear that the point 202 is associated with the vehicle 200 and the point 192 is associated with the vehicle 190, both of which were already known from FIG. 5B. More importantly, it is now clear that the measurement point 188 is associated with the vehicle 190, as the point 188 has a near-zero range rate.

The example shown in FIGS. 5A-C and discussed above uses range rate as an attribute of the sensor measurements and the tracked target vehicles to increase grouping accuracy. In addition to range rate, many other attributes can be used in a similar fashion. These other attributes include: micro-Doppler data (available from radar or lidar systems), which can detect small movements such as vehicle body motion and vibrations; target cross-section, which is determined by how much energy is returned from an object in a radar or lidar signal, and which is an indication of object size and/or material; signal-to-noise ratio in measurement points; and numerous attributes which can be provided by camera-based object sensing systems, including color, pattern, appearance/texture and size.

As discussed above, range is a key parameter used in grouping sensor measurement points with tracked targets. However, there is an inherent loss of accuracy in sensor measurements at larger distances. For example, some radar-based object sensing systems have a range error which is about 5% of the range. At longer ranges, the range error could be enough to cause a sensor measurement point to lie outside the boundaries of a tracked vehicle. This discrepancy can be overcome by using a log scale representation of range data.

Figure 6:
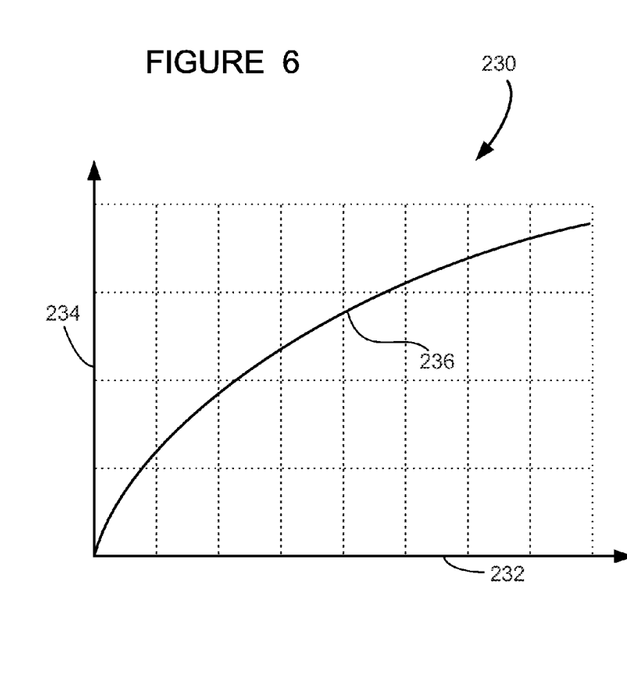
FIG. 6 is a graph of mapped range measurement versus actual range measurement, where the mapped range is computed on a log scale.

FIG. 6 is a graph 230 of mapped range measurement versus actual range measurement, where the mapped range is computed on a logarithmic scale. Axis 232 measures actual range measurement, while axis 234 measures mapped range measurement. In one embodiment, the mapped range value $\bar{r}$ can be determined using the following equation:

$$\bar{r} = \frac{\log\left(\frac{r\lambda}{L}\right)}{\log(1+\lambda)} \quad (2)$$

Where r is the actual range value, L is a distance-compression ratio and λ is a cell size used in grid partitioning of the mapped area. FIG. 6 shows the non-linear mapping of range resulting from using Equation (2) with values of L equal to 3% and λ equal to 1 meter. This range mapping technique diminishes range differences at larger range values.

Figure 7A:
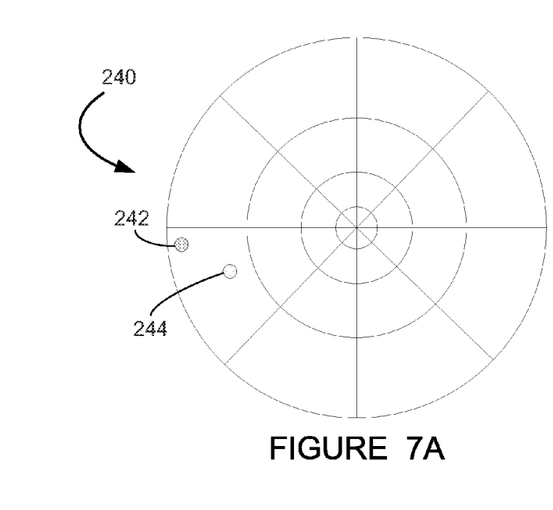
FIG. 7A is a graph in polar coordinates of sensor measurements relative to a host vehicle, where actual range measurement is used on the radial scale.

FIG. 7A is a graph 240 in polar coordinates of sensor measurements relative to a host vehicle, where actual range measurement is plotted on the radial scale and azimuth angle is plotted circumferentially. Measurement points 242 and 244 are shown on the graph 240. The points 242 and 244 are fairly far apart on the graph 240, such that their range difference is greater than the length of a typical vehicle. However, much of this range difference may be due to error in the sensor measurement at the long range. Thus, it is not clear if the points 242 and 244 belong to the same vehicle or not.

Figure 7B:
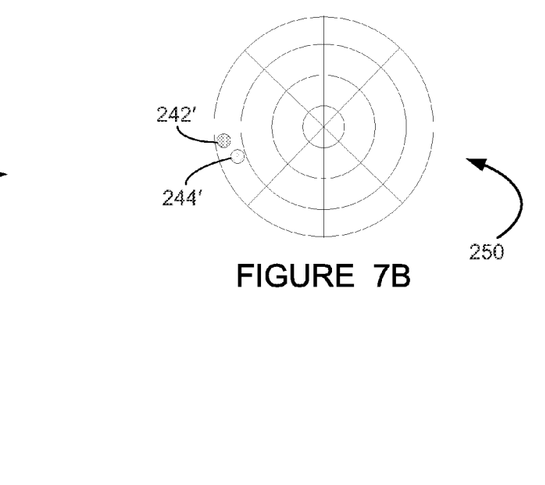
FIG. 7B is a graph in polar coordinates of sensor measurements relative to a host vehicle, where log-mapped range measurement is used on the radial scale, thereby reducing variation in range.

FIG. 7B is a graph 250 in polar coordinates of sensor measurements relative to a host vehicle, where log-mapped range measurement is used on the radial scale, thereby reducing variation in range. When the mapped range $\bar{r}$ is used on the radial scale as on the graph 250, distances are compressed, and distance errors are reduced. When plotted on the graph 250 using their mapped range values $\bar{r}$, the points 242' and 244' are close enough together to be clearly associated with the same target vehicle.

The techniques described above, individually and used collectively, significantly enhance the accuracy of sensor measurement grouping with tracked targets. Along with accuracy, computational efficiency is also an extremely important factor in object detection system performance. Techniques are described below which increase the computational efficiency of sensor measurement grouping with tracked targets.

In a traditional target grouping algorithm, all possible combinations of sensor measurement points (points returned from a radar system, etc.) and known fusion targets (vehicles, etc.) are enumerated and evaluated. In this traditional approach, for a scenario with N sensor measurements and N fusion targets, the calculation complexity is on the order of $N^2$. An improved approach is proposed below, where objects (i.e., sensor measurements) are sorted in a hash table before matching, resulting in an order of magnitude faster calculation (on the order of N rather than $N^2$).

Figure 8A:
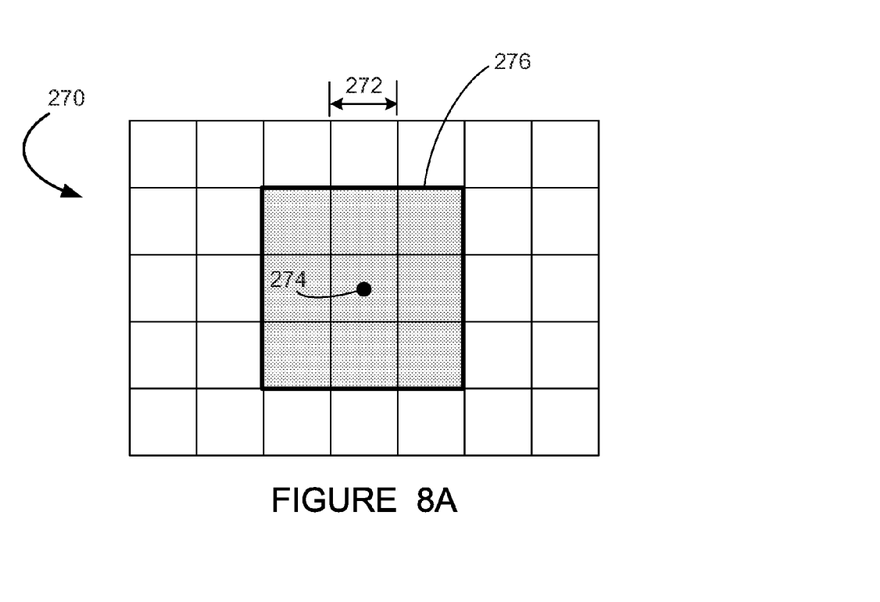
FIG. 8A is an illustration of a grid which can be used to group sensor measurements with known targets.

FIG. 8A is an illustration of a grid 270 which can be used to group sensor measurements with known targets. The grid 270 represents the x-y space in front of a host vehicle, where tracked targets exist and sensor measurement points are provided. Each cell of the grid 270 is a square with a size (272) equal to W. A sensor measurement point 274 at coordinates (x,y) is assigned to cell (i,j) such that:

$$i = \left[\frac{x}{W} + 0.5 \text{ sign}(x)\right], j = \left[\frac{y}{W} + 0.5 \text{ sign}(y)\right] \quad (3)$$

Where i and j are rounded to integer cell numbers. In this way, each measurement point is indexed with its cell number using a hash table 280, shown in FIG. 8B.

Figure 8B:
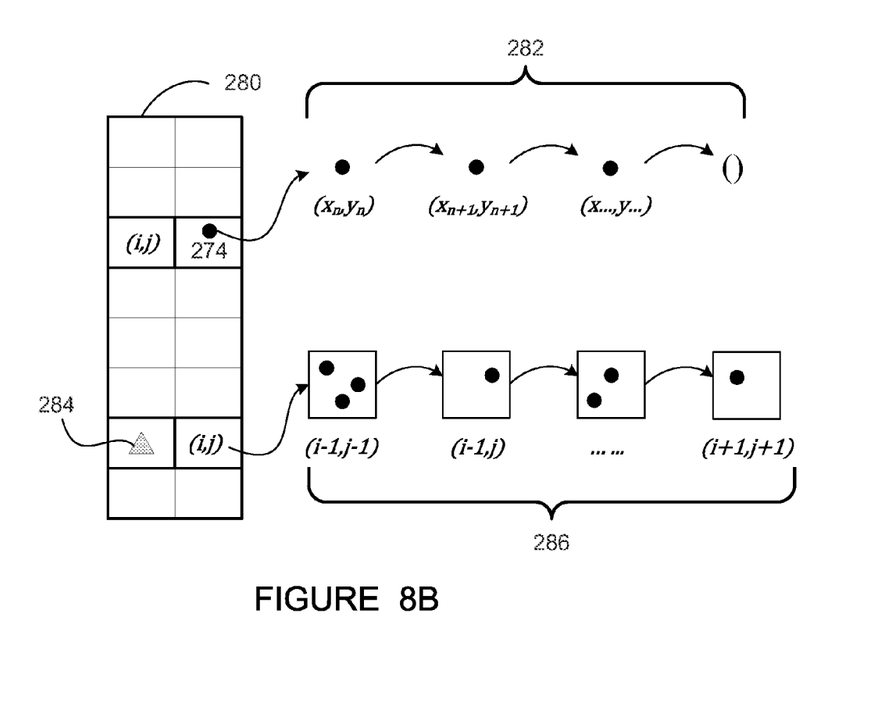
FIG. 8B is an illustration of a hash table and a technique for efficiently grouping sensor measurements with known targets using the grid of FIG. 8A.

For example, if the sensor measurement point 274 at coordinates (x,y) is assigned to cell (i,j), then a linked list 282 can be created which contains all measurement points also assigned to cell (i,j). This list is created using Equation (3) for each point's coordinates $(x_n, y_n)$, resulting in a linked list (such as the list 282) for each cell in the grid 270 which contains any points.

It is then straightforward to identify the cells which are neighbors of the cell (i,j)—that is, the eight cells which surround the cell (i,j), ranging from (i−1,j−1) . . . (i+1,j+1). This nine-cell group, shown in box 276 of FIG. 8A, may represent a fusion target such as a vehicle. Then, for a fusion target which has a hypothesis centroid location 284 which falls within cell (i,j), a list 286 can be created including all nine cells in the box 276, and the sensor measurement points associated with each cell can be populated from the linked lists 282. In this way, for all fusion targets, a list of associated measurement points can be created. The calculation of the association of points to cells for the linked lists 282 is on the order of the number of points N. The calculation of the association of cells to fusion targets for the linked lists 286 is also on the order of the number of fusion targets N. These two calculations are additive, not factored against each other. Thus, the overall point-target grouping calculation is on the order of N, rather than $N^2$ as in a traditional fully-factored approach.

The grid grouping technique discussed above can be extended to work with any desired shape of fusion target, rather than just the simple box 276 of FIG. 8A.

Figure 9:
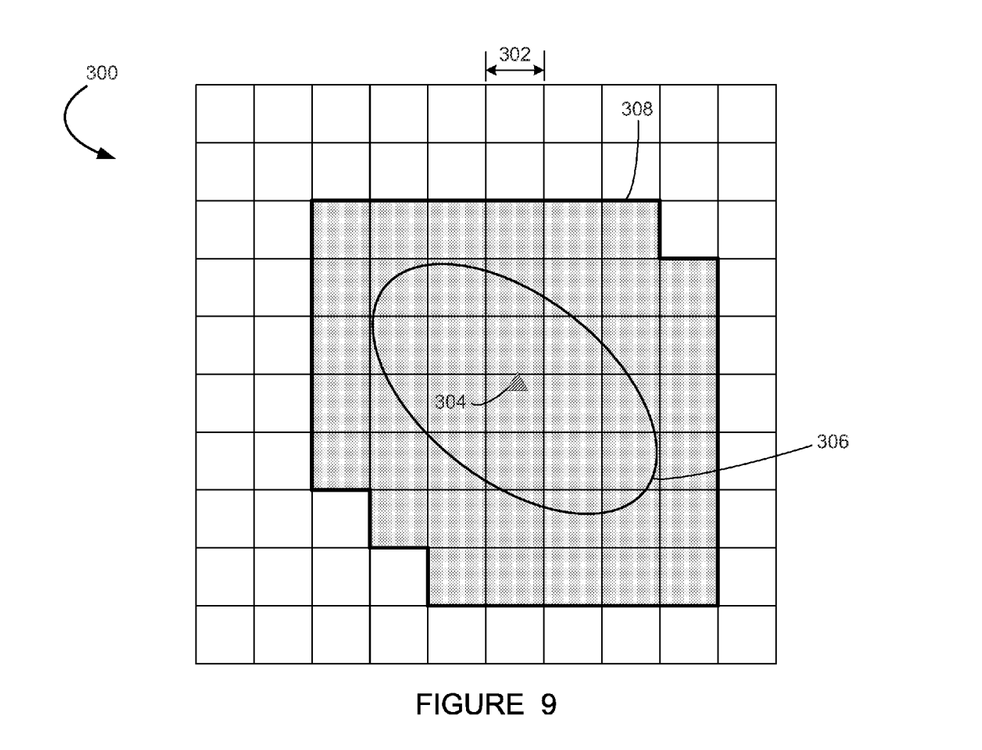
FIG. 9 is an illustration of a grid which can be used with a flood fill algorithm to group sensor measurements with known targets of arbitrary shape.

FIG. 9 is an illustration of a grid 300 which can be used with a flood fill algorithm to group sensor measurements with fusion targets of arbitrary shape. The grid 300 again represents the x-y space in front of a host vehicle, where tracked targets exist and sensor measurement points are provided. As before, each cell of the grid 300 is a square with a size (302) equal to W. Measurement points can be associated with cells in the grid 300 using a hash table and linked list, as discussed above.

Now, however, instead of identifying neighbor points within a simple box, an arbitrary shape target can be defined and a flood fill algorithm can be used to create a list of cells. In the scenario of FIG. 9, a fusion target has a hypothesis centroid location 304. The fusion target has a shape defined by an ellipse 306, the axes of which need not be aligned with the rectangular pattern of the grid 300. Straightforward geometric calculations can be used to identify a list of grid cells, any part of which are within the ellipse 306. Once the list of cells which are "touched by" the ellipse 306 (any part being inside) is known, then each of these cells is tested to ensure that its neighbors (above, below, left and right—creating a nine-cell box as before) are also included in the list of cells. The resulting group of cells identified by the flood fill algorithm—the cells touched by or neighbors of the cells touched by the ellipse 306—is shown as shaded within region 308 of FIG. 9.

After performing the flood fill calculation discussed above, a list of cells neighboring the ellipse 306 centered at the centroid 304 are known. The hash table and linked list technique described previously can then be used to identify the measurement points associated with the ellipse 306 and thus the fusion target with centroid 304. In real world applications, the area covered by the grid 300 is very large—for example, extending 100 meters ahead of the host vehicle, and containing thousands of grid cells of size 1 meter square. In such a case, even with several target vehicles being tracked, only a few hundred grid cells will be filled. Thus, compared to a fully-factored approach which compares every measurement point to every fusion target, the flood fill and hash table technique of FIG. 9 is very computationally efficient.

Figure 10:
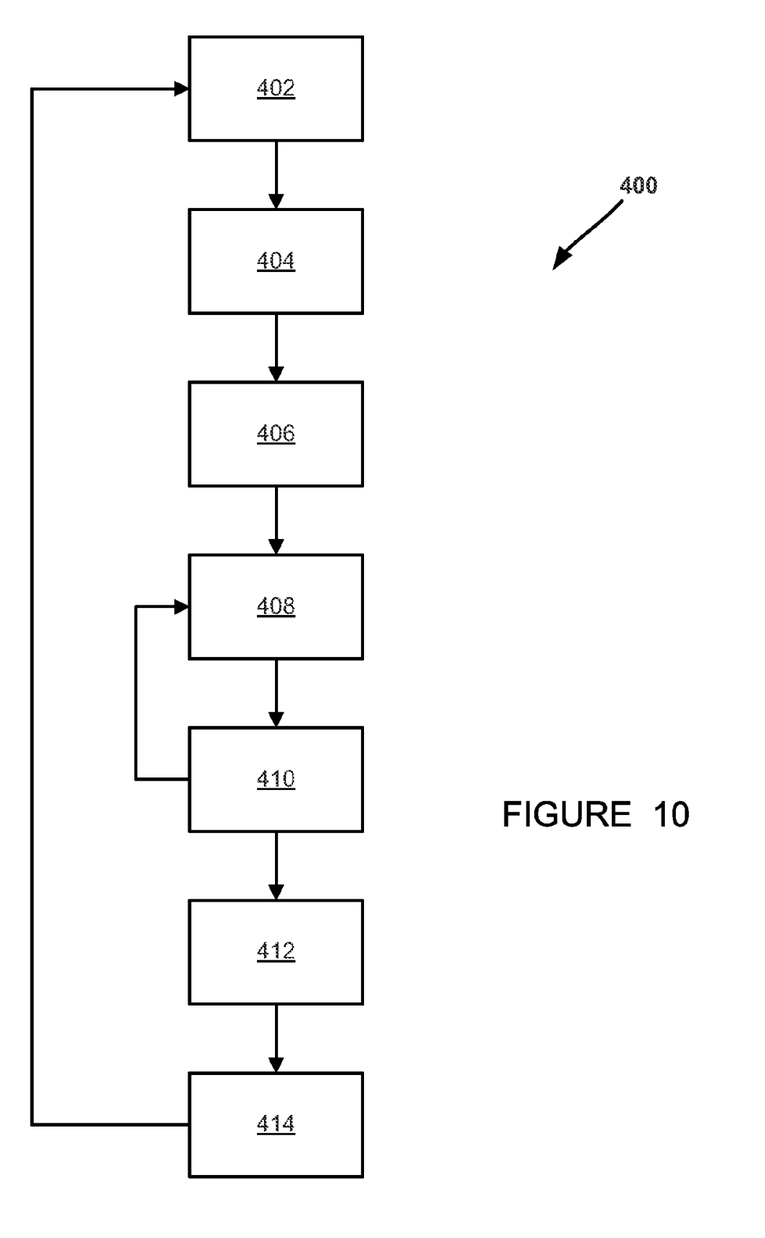
FIG. 10 is a flowchart diagram of a method for grouping object sensor measurements with targets in an object detection system.

FIG. 10 is a flowchart diagram 400 of a method for grouping object sensor measurements with targets in an object detection system. The method of the flowchart diagram 400 includes the accuracy and computational efficiency techniques discussed above. The method of the flowchart diagram 400 is designed to be carried out on a processor in an object detection system, such as the object detection system 12 of FIG. 1.

At box 402, a list of tracked targets is provided. The list of tracked targets is sometimes described in the foregoing as fusion targets because fusion techniques are often used in identifying the targets. At box 404, a list of hypothesis target locations and orientations is created. The hypothesis target data is created using previous target location/orientation data from the box 402, along with target velocities if moving, road curvature information, etc. At box 406, sensor measurement points are provided by one or more object sensing systems, such as the object sensing systems 20 and 30 of FIG. 1. As discussed previously, the sensor measurement points may be obtained using radar, lidar, ultrasound, camera, or other suitable object sensing technology.

At box 408, sensor measurement points are grouped with hypothesis targets. The point/target grouping uses at least geometric data (location) for matching points with targets. The grouping may use the grid-based hash table techniques described in FIGS. 8A/B and 9. The grouping may also use supplemental target attributes—such as range rate, micro-Doppler data, target cross-section, signal-to-noise ratio in measurement points, and visual attributes provided by camera-based object sensing systems. These supplemental target attributes provide greater certainty in grouping measurement points with targets. The grouping at the box 408 may also use a log-mapped representation of range, rather than actual range.

At box 410, the hypothesis centroid locations are validated, and may be adjusted if necessary to obtain optimum grouping results. If the hypothesis centroid locations are adjusted at the box 410, then the process loops back to the box 408 to re-calculate the point/target grouping. At box 412, new targets are identified based on any clusters of measurement points which do not group with known targets at the box 408. At box 414, an updated list of target locations and orientations is output. The updated target list from the box 414 is used as input by onboard vehicle applications such as collision warning and collision avoidance systems. The updated target list from the box 414 is also provided back to the box 402 to begin the next iteration of the point/target grouping method.

Using the methods disclosed herein, the speed and accuracy of point/target grouping calculations in an object detection system can be greatly improved. Fast, accurate object detection data can be used by many important systems onboard vehicles—to warn drivers of potential collision hazards or automatically take evasive action to avoid a collision, and for other purposes.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for grouping object sensor measurements with target objects in an object detection system, said method comprising:

providing a list of target objects being tracked by the object detection system, where the list of target objects includes known targets identified by the object detection system in an area ahead of a host vehicle;

computing hypothesis locations and orientations for each known target in the list of target objects, where the hypothesis locations and orientations include a prediction of each known target's movement since the list of target objects was previously computed, where computing hypothesis locations and orientations for each known target includes using digital map data to predict a location and orientation of each known target based on road curvature data and target velocity;

providing sensor measurement points from at least one object sensing system, where the sensor measurement points designate points at which an object has been detected in the area ahead of the host vehicle;

grouping, using a microprocessor, the sensor measurement points with the known targets at the hypothesis locations and orientations;

validating the hypothesis locations and orientations based on the grouping;

identifying new targets based on any clusters of sensor measurement points which do not correlate to one of the known targets; and updating the list of target objects to include the known targets at the hypothesis locations and orientations, and any new targets identified.

2. The method of claim 1 wherein the list of target objects includes, for each of the known targets, attribute data including micro-Doppler data, target cross-section, signal-to-noise ratio in measurement points, and visual attributes if available from a camera-based object sensing system.

3. The method of claim 1 wherein the list of target objects includes, for each of the known targets, a range and azimuth angle relative to the host vehicle, and a range rate relative to the host vehicle.

4. The method of claim 3 wherein grouping the sensor measurement points with the known targets includes comparing both the range and the range rate of the points and the targets to establish correlations.

5. The method of claim 1 wherein computing hypothesis locations and orientations for each known target includes using object data provided by one or more sources external to the host vehicle, including object data provided by other vehicles and object data detected and provided by roadside infrastructure.

6. The method of claim 1 wherein grouping the sensor measurement points with the known targets includes using a grid-based technique which assigns each of the measurement points to a grid cell based on location, identifies a subset of grid cells in a neighborhood of each of the known targets, and groups the measurement points in the identified subset of grid cells with the known target.

7. The method of claim 6 wherein the grid-based technique includes identifying the subset of grid cells in the neighborhood of each of the known targets by establishing a nine-cell square of grid cells surrounding a centroid of each of the known targets.

8. The method of claim 6 wherein the grid-based technique includes using a flood fill algorithm to identify the subset of grid cells in the neighborhood of each of the known targets, where the known targets can have any arbitrary shape and orientation.

9. The method of claim 1 wherein providing sensor measurement points from at least one object sensing system includes providing sensor measurement points from a radar-based object sensing system and from a camera-based object sensing system.

10. The method of claim 1 further comprising using the list of target objects in a collision warning system on the host vehicle.

11. A method for grouping object sensor measurements with target objects in an object detection system, said method comprising:
  providing a list of target objects being tracked by the object detection system, where the list of target objects includes known targets identified by the object detection system in an area ahead of a host vehicle;
  computing hypothesis locations and orientations for each known target in the list of target objects, where the hypothesis locations and orientations include a prediction of each known target's movement since the list of target objects was previously computed based on road curvature data and target velocity;
  providing sensor measurement points from at least one object sensing system, where the sensor measurement points designate points at which an object has been detected in the area ahead of the host vehicle;
  grouping, using a microprocessor, the sensor measurement points with the known targets at the hypothesis locations and orientations, including comparing both a range and a range rate of the points and the targets to establish correlations, and further including using a mapped range value for the measurement points and the known targets, where the mapped range value is computed from an actual range value using a logarithmic scale;
  validating the hypothesis locations and orientations based on the grouping;
  identifying new targets based on any clusters of sensor measurement points which do not correlate to one of the known targets; and
  updating the list of target objects to include the known targets at the hypothesis locations and orientations, and any new targets identified.

12. The method of claim 11 wherein grouping the sensor measurement points with the known targets includes using a grid-based technique which assigns each of the measurement points to a grid cell based on location, identifies a subset of grid cells in a neighborhood of each of the known targets, and groups the measurement points in the identified subset of grid cells with the known target.

13. An object detection system comprising:
  at least one object sensing system onboard a host vehicle, said object sensing system providing sensor measurement points which designate points at which an object has been detected in an area ahead of the host vehicle;
  a memory module for storing a list of target objects being tracked by the object detection system, where the list of target objects includes known targets identified by the object detection system in the area ahead of the host vehicle; and
  an object detection processor in communication with the memory module and the at least one object sensing system, said object detection processor being configured to:
  compute hypothesis locations and orientations for each known target in the list of target objects, where the hypothesis locations and orientations include a prediction of each known target's movement since the list of target objects was previously computed, wherein computing hypothesis locations and orientations for each known target by the processor includes using digital map data to predict a location and orientation of each known target based on road curvature data and target velocity;
  group the sensor measurement points with the known targets at the hypothesis locations and orientations;
  validate the hypothesis locations and orientations based on the grouping;
  identify new targets based on any clusters of sensor measurement points which do not correlate to one of the known targets; and
  update the list of target objects to include the known targets at the hypothesis locations and orientations, and any new targets identified.

14. The object detection system of claim 13 wherein the list of target objects includes, for each of the known targets, attribute data including micro-Doppler data, target cross-section, signal-to-noise ratio in measurement points, and visual attributes if available from a camera-based object sensing system.

15. The object detection system of claim 13 wherein the list of target objects includes, for each of the known targets, a range and azimuth angle relative to the host vehicle, and a range rate relative to the host vehicle, and where grouping the sensor measurement points with the known targets by the processor includes comparing both the range and the range rate of the points and the targets to establish correlations.

16. The object detection system of claim 13 wherein grouping the sensor measurement points with the known targets by the processor includes using a grid-based technique which assigns each of the measurement points to a grid cell based on location, identifies a subset of grid cells in a neighborhood of each of the known targets, and groups the measurement points in the identified subset of grid cells with the known target.

17. The object detection system of claim 16 wherein the grid-based technique includes using a flood fill algorithm to identify the subset of grid cells in the neighborhood of each of the known targets, where the known targets can have any arbitrary shape and orientation.

18. The object detection system of claim 13 wherein grouping the sensor measurement points with the known targets by the processor includes using a mapped range value for the measurement points and the known targets, where the mapped range value is computed from an actual range value using a logarithmic scale.

* * * * *